(12) United States Patent
Singh et al.

(10) Patent No.: US 9,222,008 B2
(45) Date of Patent: Dec. 29, 2015

(54) ESTER CARBONATE POLYOLS FOR HYDROLYTICALLY STABLE ADHESIVES

(71) Applicants: Harpreet Singh, Pearland, TX (US); Viviano Bertolone, Lurago Marinone (IT); Orazio Rubulotta, Limido Comasco (IT); Jorge Jimenez, Lake Jackson, TX (US); William H. Heath, Lake Jackson, TX (US); Amarnath Singh, Pearland, TX (US); William A. Koonce, Pearland, TX (US)

(72) Inventors: Harpreet Singh, Pearland, TX (US); Viviano Bertolone, Lurago Marinone (IT); Orazio Rubulotta, Limido Comasco (IT); Jorge Jimenez, Lake Jackson, TX (US); William H. Heath, Lake Jackson, TX (US); Amarnath Singh, Pearland, TX (US); William A. Koonce, Pearland, TX (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/357,262

(22) PCT Filed: Dec. 4, 2012

(86) PCT No.: PCT/EP2012/074313
§ 371 (c)(1),
(2) Date: May 9, 2014

(87) PCT Pub. No.: WO2013/087449
PCT Pub. Date: Jun. 20, 2013

(65) Prior Publication Data
US 2015/0031815 A1  Jan. 29, 2015

(30) Foreign Application Priority Data
Dec. 14, 2011 (IT) .......................... MI2011A002260

(51) Int. Cl.
| | | |
|---|---|---|
| *C09J 175/06* | (2006.01) | |
| *C08G 63/64* | (2006.01) | |
| *C08G 18/10* | (2006.01) | |
| *C08G 18/12* | (2006.01) | |
| *C08G 18/40* | (2006.01) | |
| *C08G 18/42* | (2006.01) | |
| *C08G 18/44* | (2006.01) | |
| *C09J 175/04* | (2006.01) | |
| *C09J 163/04* | (2006.01) | |

(52) U.S. Cl.
CPC .............. *C09J 175/06* (2013.01); *C08G 18/10* (2013.01); *C08G 18/12* (2013.01); *C08G 18/4009* (2013.01); *C08G 18/4018* (2013.01); *C08G 18/4045* (2013.01); *C08G 18/4202* (2013.01); *C08G 18/44* (2013.01); *C08G 63/64* (2013.01); *C09J 163/04* (2013.01); *C09J 175/04* (2013.01)

(58) Field of Classification Search
CPC .... C09J 169/005; C09J 169/00; C09J 175/06; C08G 18/44; C08G 18/42
USPC .............................. 524/590; 525/92 F, 440.01
See application file for complete search history.

(56) References Cited

U.S. PATENT DOCUMENTS

| | | | |
|---|---|---|---|
| 4,142,021 A | | 2/1979 | Dixon et al. |
| 5,134,216 A | * | 7/1992 | Jansen et al. ..................... 528/48 |
| 5,290,905 A | | 3/1994 | Komiya et al. |
| 5,334,690 A | * | 8/1994 | Schafheutle et al. ........... 528/71 |
| 7,964,665 B2 | * | 6/2011 | Nagao et al. ................... 524/591 |
| 2008/0255319 A1 | * | 10/2008 | Ratliff et al. ................... 525/419 |
| 2013/0331510 A1 | | 12/2013 | Singh et al. |
| 2014/0088245 A1 | | 3/2014 | Singh et al. |

FOREIGN PATENT DOCUMENTS

EP 1777243 A1 4/2007

OTHER PUBLICATIONS

PCT/EP2012/074313, 20130521, International Search Report and Written Opinion.
PCT/EP2012/074313, 20130521, International Preliminary Report on Patentability.

* cited by examiner

Primary Examiner — Tae H Yoon

(57) ABSTRACT

A two-component curable adhesive or sealant composition is provided. The first component may comprise a mixture of at least one polyol selected from the group comprising a polyester polyol, a polyester-polycarbonate copolymer polyol, and combinations thereof, a resin, and optionally a solvent. The second component may comprise a prepolymer obtained by reacting a polyester-polycarbonate copolymer polyol which is the reaction product of a polyester polyol which is the reaction product of one or more organic acids, and one or more glycols having a functionality of two or more and one or more polycarbonate polyols, at least one organic polyisocyanate component, and at least one chain extending agent and optionally a solvent. Alternatively, the first component may comprise a polyester-polycarbonate copolymer polyol, a resin, and optionally a solvent. The second component may comprise a polyisocyanate curative and optionally a solvent. The cured adhesive exhibits improved hydrolytic properties while maintaining excellent processability and adhesive properties.

15 Claims, No Drawings

ESTER CARBONATE POLYOLS FOR HYDROLYTICALLY STABLE ADHESIVES

This application is a 371National Stage of PCT/EP2012/074313, filed on Dec. 4, 2012, and claims priority to Italian Patent Application No. MI2011A002260, filed on Dec. 14, 2011.

BACKGROUND

1. Field

Embodiments of the invention generally relate to adhesives and sealants. More particularly, embodiments of the invention relate to adhesives and sealants having excellent hydrolytic stability.

2. Description of the Related Art

Polyester based polyurethane adhesives generally have excellent adhesion strength, UV and thermo oxidative stability, abrasion and chemical stability. However, polyester based polyurethane adhesives generally suffer from poor hydrolytic stability since their ester linkages are prone to hydrolysis. This deficiency limits the useful life-time of polyurethane based adhesives. Therefore there is a need for adhesives and sealants that have excellent hydrolytic stability while maintaining processability and adhesive properties

SUMMARY

Embodiments of the invention generally relate to adhesives and sealants. More particularly, embodiments of the invention relate to adhesives and sealants having excellent hydrolytic stability. In one embodiment a two-component curable adhesive or sealant composition is provided. The first component (a) comprises a mixture of (i) at least one polyol selected from the group comprising a polyester polyol, a polyester-polycarbonate copolymer polyol, and combinations thereof, (ii) a resin, and (iii) optionally a solvent. The second component (b) comprises (i) a prepolymer obtained by reacting a polyester-polycarbonate copolymer polyol which is the reaction product of a polyester polyol which is the reaction product of one or more organic acids, and one or more glycols having a functionality of two or more and one or more polycarbonate polyols, at least one organic polyisocyanate component, and at least one chain extending agent and (ii) optionally a solvent. The cured adhesive exhibits improved hydrolytic properties while maintaining excellent processability and adhesive properties.

In another embodiment a two-component curable adhesive or sealant composition is provided where the first component (a) comprises a mixture of (i) a polyester-polycarbonate copolymer polyol, (ii) a resin, and (iii) optionally a solvent. The second component (b) comprises (i) a polyisocyanate curative and (ii) optionally a solvent.

DETAILED DESCRIPTION

Embodiments of the invention generally relate to adhesives and sealants. More particularly, embodiments of the invention relate to adhesives and sealants having excellent hydrolytic stability.

Photovoltaic (PV) modules produce electricity by harnessing the sun's energy. A typical PV module comprises a silicon wafer which is brittle and is packaged in soft and clear ethyl vinyl acetate (EVA) polymer. The top EVA sheet is protected by a glass and the bottom EVA sheet is protected by a back sheet. The backsheet is exposed to the environment and provides chemical resistance, electrical insulation, UV protection and water proofing thereby preventing degradation of the EVA/silicon wafer. The backsheet is composed of multiple layers which are glued together. Each layer of the backsheet has specific functionality. For example, the backsheet may be composed of a polyethylene terephthalate (PET) sheet sandwiched between two TEDLAR® polyvinyl fluoride (PVF) sheets. TEDLAR® PVF sheets provide resistance to water, UV and weather while PET provides mechanical strength. The backsheet is finally bonded to EVA.

The adhesives used for bonding different materials in the backsheet and bonding the backsheet to EVA can be a solvent based polyurethane adhesive. The adhesive should provide, among other things, good bond strength, thermal resistance, hydrolysis resistance, flexibility and should be non-yellowing. Adhesives based on high molecular weight polyester polyol (molecular weight (Mn)~8,000) based polyurethanes typically meet the aforementioned criteria but have limited hydrolysis resistance. Low molecular weight polyesters (molecular weight (Mn)~2,000) have inferior hydrolytic stability. The inventors have found that the use of ester carbonate copolymer polyol leads to adhesives that meet the above mentioned performance criteria. Furthermore, the use of certain class of ester carbonate copolymer polyol enables the use of low molecular polyesters meeting above mentioned performance criteria.

Embodiments described herein provide adhesives and sealants comprising a low molecular weight polyester-polycarbonate copolymer that has excellent adhesion, hydrolytic, UV and thermal stability. Typically pure polyester and polycarbonate polyols are generally crystalline and solid at room temperature. The copolymer of ester and carbonate may be waxy (e.g., 75:25 carbonate to ester) or liquid (e.g., 50:50 carbonate to ester) depending on the ratio of ester and carbonate in the copolymer. The ability to control the physical state is advantageous since it affects the viscosity of the final product which is important for processing of the adhesive. Adhesives and sealants based on the copolymer of ester carbonate described herein have excellent hydrolytic stability and good initial adhesion compared to similar adhesives based on ester while maintaining excellent processability.

Embodiments described herein provide a two-component curable adhesive or sealant composition that includes (a) a first component comprising a mixture of (i), at least one polyol selected from the group comprising a polyester polyol, a polyester-polycarbonate copolymer polyol, and combinations thereof, (ii) a resin, and (iii) optionally a solvent and (b) a second component comprising (i) a prepolymer comprising the reaction product of a polyester-polycarbonate copolymer polyol and at least one organic polyisocyanate component, at least one cross-linker, and (ii) optionally a solvent.

The first component (a) may be present at from 60% to 90% by weight of the two-component composition. The first component (a) may comprise at least 60 wt. %, 65 wt. %, 70 wt. %, 75 wt. %, 80 wt. %, or 85 wt. % of the two-component composition. The first component (a) may comprise up to 65 wt. %, 70 wt. %, 75 wt. %, 80 wt. %, 85 wt. %, or 95 wt. % of the two-component composition.

The second component (b) may be present at from 10% to 40% by weight of the two-component composition. The second component (b) may comprise at least 10 wt. %, 15 wt. %, 20 wt. %, 25 wt. %, 30 wt. %, or 35 wt. % of the two-component composition. The second component (b) may comprise up to 15 wt. %, 20 wt. %, 25 wt. %, 30 wt. %, 35 wt. %, or 40 wt. % of the two-component composition.

The first component (a) comprises a mixture obtained by mixing (i) at least one polyol selected from the group comprising a polyester polyol, a polyester-polycarbonate copolymer polyol, and combinations thereof, (ii) a resin, and (iii) optionally a solvent. The polyester-polycarbonate copolymer polyol (i) may be the reaction product of one or more polyester polyols and one or more polycarbonate polyols.

Suitable polyester polyols are well known in the industry. Illustrative of such suitable polyester polyols are those produced by reacting a dicarboxylic acid and/or monocarboxylic acid with an excess of a diol and or polyhydroxy alcohol. The one or more polyester polyols made by the reaction product of one or more organic acids and one or more glycols or polyglycols having a functionality of two or more.

The one or more organic acids may be selected from the group comprising for example, phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids (linolic, oleic and the like) and combinations thereof. The one or more organic acids may be aliphatic acids, aromatic acids, or combinations thereof. Anhydrides of the above acids, where they exist, can also be employed. In addition, certain materials which react in a manner similar to acids to form polyester polyol oligomers are also useful. Such materials include lactones such as caprolactone, and methylcaprolactone, and hydroxy acids such as tartaric acid and dimethylolpropionic acid. If a triol or higher hydric alcohol is used, a monocarboxylic acid, such as acetic acid, may be used in the preparation of the polyester polyol oligomer, and for some purposes, such as polyester polyol oligomer may be desirable. Polyester polyol oligomers which normally are not hydrophilic within the above definition but which can be rendered hydrophilic by appropriate techniques, for example, oxyalkylation utilizing ethylene oxide and propylene oxide are considered to be hydrophilic polyols in the context of the present invention. Preferably, the one or more organic acids is adipic acid.

The one or more glycols or polyglycols having a functionality of two or more may be selected from the group comprising for example, ethylene glycol, butanediol, dimer diol, propylene glycol-(1,2) and propylene glycol-(1,3), octane-1,8-diol, neopentyl glycol, cyclohexane dimethanol (1,4-bis-hydroxymethylcyclo hexane), 2-methyl-1,3-propane diol, glycerine, trimethylolpropane, hexanediol-(1,6), hexanetriol-(1,2,6) butane triol-(1,2,4), trimethylolethane, pentaerythritol, quinitol, mannitol and sorbitol, methylglycoside, also diethylene glycol, triethylene glycol, tetrathylene glycol, polyethylene glycols, dibutylene glycol, polybutylene glycols, and combinations thereof. The one or more glycols or polyglycols having a functionality of two or more preferably include diethylene glycol and glycerine.

The polyester polyol may comprise at least 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, or 90 wt. % of the polyester-polycarbonate copolymer polyol. The polyester polyol may comprise up to 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the polyester-polycarbonate copolymer polyol.

Suitable polyester polyols are available from Northane Chemicals under the trade name Bester polyester polyols. Suitable commercially available products of that type include Bester 20 polyester polyol, Bester 35 polyester polyol, Bester 41 polyester polyol, Bester 80 polyester polyol, Bester 100 polyester polyol, Bester 113 polyester polyol, Bester 176 polyester polyol, and Bester 190 polyester polyol.

The one or more polycarbonate polyols may comprise repeating units from one or more alkane diols having 2 to 50 carbon atoms. The one or more polycarbonate polyols may comprise repeating units from one or more alkane diols having 2 to 20 carbon atoms. The one or more polycarbonate polyols may be difunctional polycarbonate polyols.

The one or more polycarbonate polyols may have a number average molecular weight from about 500 to about 5,000, preferably, from about 500 to about 3,000, more preferably, from about 1,500 to about 2,500.

The one or more polycarbonate polyols may have a hydroxyl number average from about 22 to about 220 mg KOH/g, for example, from about 45 to 75 mg KOH/g.

The one or more polycarbonate polyols may have a viscosity from about 4,000 to about 15,000 centipoises (cp) measured at 60 degrees Celsius by parallel plate rheometry.

The one or more polycarbonate polyols may be prepared by reacting at least one polyol mixture comprising one or more alkane diols with at least one organic carbonate. The one or more polycarbonate polyols may be obtained by subjecting the at least one polyol mixture and the at least one carbonate compound to a polymerization reaction. With respect to the method for performing the polymerization reaction, there is no particular limitation, and the polymerization reaction can be performed by using conventional methods known in the art.

The one or more alkane diols may be selected from the group comprising: aliphatic diols having 2 to 50 carbon atoms in the chain (branched or unbranched) which may also be interrupted by additional heteroatoms such as oxygen (O), sulphur (S) or nitrogen (N). Examples of suitable diols are 1,3-propanediol, 1,4-butanediol, 1,5-pentanediol, 1,6-hexanediol, 1,7-heptanediol, 1,2-dodecanediol, cyclohexanedimethanol, 3-methyl-1,5-pentanediol, 2,4-diethyl-1,5-pentanediol, bis(2-hydroxyethyl)ether, bis(6-hydroxyhexyl) ether or short-chain $C_2$, $C_3$ or $C_4$ polyether diols having a number average molecular weight of less than 700 g/mol, combinations thereof, and isomers thereof.

The at least one carbonate compound may be selected from alkylene carbonates, diaryl carbonates, dialkyl carbonates, dioxolanones, hexanediol bis-chlorocarbonates, phosgene and urea. Examples of suitable alkylene carbonates may include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Examples of suitable dialkyl carbonates may include dimethyl carbonate, diethyl carbonate, di-n-butyl carbonate, and the like and the diaryl carbonates may include diphenyl carbonate.

The polymerization reaction for the polycarbonate polyol may be aided by a catalyst. With respect to the method for performing the polymerization reaction, there is no particular limitation, and the polymerization reaction can be performed by using conventional methods known in the art. The polymerization reaction may be a transesterification reaction. In a transesterification reaction, one preferably contacts reactants in the presence of a transesterification catalyst and under reaction conditions. In principle, all soluble catalysts which are known for transesterification reactions may be used as catalysts (homogeneous catalysis), and heterogeneous transesterification catalysts can also be used. The process according to the invention is preferably conducted in the presence of a catalyst.

Hydroxides, oxides, metal alcoholates, carbonates and organometallic compounds of metals of main groups I, II, III and IV of the periodic table of the elements, of subgroups III and IV, and elements from the rare earth group, particularly compounds of Ti, Zr, Pb, Sn and Sb, are particularly suitable for the processes described herein.

Suitable examples include: LiOH, $Li_2CO_3$, $K_2CO_3$, KOH, NaOH, KOMe, NaOMe, MeOMgOAc, CaO, BaO, KOt-Bu, $TiCl_4$, titanium tetraalcoholates or terephthalates, zirconium tetraalcoholates, tin octoate, dibutyltin dilaurate, dibutyltin, bistributyltin oxide, tin oxalate, lead stearate, antimony trioxide, and zirconium tetraisopropylate.

Aromatic nitrogen heterocycles can also be used in the process described herein, as can tertiary amines corresponding to $R_1R_2R_3N$, where $R_{1-3}$ independently represents a $C_1$-$C_{30}$ hydroxyalkyl, a $C_4$-$C_{30}$ aryl or a $C_1$-$C_{30}$ alkyl, particularly trimethylamine, triethylamine, tributylamine, N,N-dimethylcyclohexylamine, N,N-dimethyl-ethanolamine, 1,8-diaza-bicyclo-(5.4.0)undec-7-ene, 1,4-diazabicyclo-(2.2.2)octane, 1,2-bis(N,N-dimethyl-amino)-ethane, 1,3-bis (N-dimethyl-amino)propane and pyridine.

Alcoholates and hydroxides of sodium and potassium (NaOH, KOH, KOMe, NaOMe), alcoholates of titanium, tin or zirconium (e.g. $Ti(OPr)_4$), as well as organotin compounds may also be used, wherein titanium, tin and zirconium tetraalcoholates may be used with diols which contain ester functions or with mixtures of diols with lactones.

The amount of catalyst present depends on the type of catalyst. In certain embodiments described herein, the homogeneous catalyst is used in concentrations (expressed as percent by weight of metal with respect to the aliphatic diol used) of up to 1,000 ppm (0.1%), preferably between 1 ppm and 500 ppm (0.05%), most preferably between 5 ppm and 100 ppm (0.01%). After the reaction is complete, the catalyst may be left in the product, or can be separated, neutralized or masked. The catalyst may be left in the product.

Temperatures for the transesterification reaction may be between 120 degrees Celsius and 240 degrees Celsius. The transesterification reaction is typically performed at atmospheric pressure but lower or higher pressures may be used. Vacuum may be applied at the end of the activation cycle to remove any volatiles. Reaction time depends on variables such as temperature, pressure, type of catalyst and catalyst concentration.

Exemplary polycarbonate polyols comprising repeating units from one or more alkane diol components are available from Arch Chemicals, Inc., under the trade name Poly-CD™220 carbonate diol and from Bayer MaterialScience, LLC, under the tradename DESMOPHEN® polyols.

The one or more polycarbonate polyols may comprise at least 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, or 90 wt. % of the polyester-polycarbonate copolymer polyol. The one or more polycarbonate polyols (b) may comprise up to 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the polyester-polycarbonate copolymer polyol.

The polyester-polycarbonate copolymer polyol may be prepared by subjecting the one or more polyols and the one or more polycarbonate polyols to a polymerization reaction. The polymerization reaction may be a transesterification reaction. In principle, all soluble catalysts which are known for transesterification reactions may be used as catalysts (homogeneous catalysis), and heterogeneous transesterification catalysts can also be used. The exemplary catalysts described above for formation of the polycarbonate polyol may also be used for formation of the polyester-polycarbonate copolymer polyol.

As described above, temperatures for the transesterification reaction may be between 120 degrees Celsius and 240 degrees Celsius. The transesterification reaction is typically performed at atmospheric pressure but lower or higher pressures may also be useful. Vacuum may be applied at the end of the activation cycle to remove any volatiles. Reaction time depends on variables such as temperature, pressure, type of catalyst and catalyst concentration. In certain embodiments, where titanium catalysts are used in the production of the polycarbonate polyol, any residual titanium catalyst in the polycarbonate may assist with the transesterification reaction for formation of the polyester-polycarbonate copolymer polyol.

The at least one polyol may comprise from 30 to 80 weight percent of the first component (a). The at least one polyol may comprise at least 30 wt. %, 35 wt. %, 40 wt. %, 45 wt. %, 50 wt. %, 55 wt/%, 60 wt. %, 65 wt. %, 70 wt. % or 75 wt. % of the first component (a). The at least one polyol may comprise up to 35 wt. %, 40 wt. %, 45 wt. %, 50 wt. %, 55 wt/%, 60 wt. %, 65 wt. %, 70 wt. %, 75 wt. %, or 80 wt. % of the first component (a).

Resins useful in the present invention may include, for example, the glycidyl polyethers of polyhydric phenols and polyhydric alcohols. Exemplary resins that may be used in the present invention, include for example, the diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A and any combination thereof.

Exemplary resin products are available from Momentive Performance Chemicals under the trade name EPIKOTE®. Suitable commercially available products of that type include EPIKOTE™ Resin 154.

The resin may comprise from 2 to 20 weight percent of the first component (a). The resin may comprise at least 2 wt. %, 5 wt. %, 10 wt. %, 15 wt. %, or 18 wt. % of the first component (a). The resin may comprise up to 5 wt. %, 10 wt. %, 15 wt. %, 18 wt. %, or 20 wt. % of the first component (a).

The first component (a) may further comprise a solvent. Exemplary solvents include ethyl acetate, and ketones such as acetone and methyl ethyl ketone (MEK).

The solvent may comprise from 10 to 60 weight percent of the first component (a). The solvent may comprise at least 10 wt. %, 15 wt. %, 20 wt. %, 25 wt. %, 30 wt. %, 35 wt/%, 40 wt. %, or 55 wt. % of the first component (a). The solvent may comprise up to 15 wt. %, 20 wt. %, 25 wt. %, 30 wt. %, 35 wt/%, 40 wt. %, 45 wt. %, 50 wt. %, 55 wt. %, or 60 wt. % of the first component (a).

The second component (b) may comprise a mixture of (i) a prepolymer obtained by reacting the polyester-polycarbonate copolymer polyol, at least one organic polyisocyanate component, and at least a chain extending agent and (ii) optionally a solvent.

The prepolymer may comprise a polyester-polycarbonate copolymer polyol. The polyester-polycarbonate polyol may be the polyester-polycarbonate copolymer polyol as previously described herein.

The polyester-polycarbonate copolymer polyol may comprise from 10 to 60 weight percent of the prepolymer. The polyester-polycarbonate copolymer polyol may comprise at least 10 wt. %, 15 wt. %, 20 wt. %, 25 wt. %, 30 wt. %, 35 wt/%, 40 wt. %, or 55 wt. % of the prepolymer. The polyester-polycarbonate copolymer polyol may comprise up to 15 wt. %, 20 wt. %, 25 wt. %, 30 wt. %, 35 wt/%, 40 wt. %, 45 wt. %, 50 wt. %, 55 wt. %, or 60 wt. % of the prepolymer.

The prepolymer further comprises at least one organic polyisocyanate component. The at least one organic polyisocyanate component may have a functionality from about 1.9 to 4, and more preferably from 1.9 to 3.5 and especially from 2.0 to 3.3. The one or more organic polyisocyanate components may be selected from the group comprising a polymeric polyisocyanate, aromatic polyisocyanates, cycloaliphatic polyisocyanates, or aliphatic polyisocyanates Exemplary polyisocyanates include, for example, m-phenylene diisocyanate, 2,4- and/or 2,6-toluene diisocyanate (TDI), the various isomers of diphenylmethanediisocyanate (MDI), and polyisocyanates having more than 2 isocyanate groups, preferably MDI and derivatives of MDI such as biuret-modified "liquid" MDI products and polymeric MDI (PMDI), 1,3 and 1,4-(bis isocyanatomethyl)cyclohexane, isophorone diisocyanate (IPDI), hexamethylene diisocyanate (HDI), bis(4-isocyanatocyclohexyl)methane or 4,4' dimethylene dicyclohexyl diisocyanate (H12MDI), and combinations thereof, as well as mixtures of the 2,4- and 2,6-isomers of TDI, with the former most preferred in the practice of the invention. A 65/35 weight percent mixture of the 2,4 isomer to the 2,6 TDI isomer is typically used, but the 80/20 weight percent mixture of the 2,4 isomer to the 2,6 TDI isomer is also useful in the practice of this invention and is preferred based on availability. Suitable TDI products are available under the trade name VORANATE™ which is available from The Dow Chemical Company. Preferred isocyanates include methylene diphenyl diisocyanate (MDI) and or its polymeric form (PMDI) for producing the prepolymers described herein. Such polymeric MDI products are available from The Dow Chemical Company under the trade names ISONATE®, PAPI® and VORANATE®. Suitable commercially available products of that type include ISONATE® M 143 MDI which is available from The Dow Chemical Company. Cycloaliphatic polyisocyanate products are available from Evonik Industries under the trade name VESTANAT®. Suitable commercially available products of this type include VESTANAT® T 1890 polyisocyanate. Aromatic polyisocyanate products are available from Bayer MaterialScience under the trade name DESMODUR® polyisocyanate. Suitable commercially available products of this type include DESMODUR® L 75 polyisocyanate.

For elastomers, coating and adhesives the isocyanate index is generally between 80 and 125, preferably between 90 to 110. For prepolymers the isocyanate index is generally between 200 and 5,000, preferably between 200 to 2,000.

The at least one organic polyisocyanate component may comprise from 30 to 90 weight percent of the prepolymer. The at least one organic polyisocyanate component may comprise at least 30 wt. %, 35 wt. %, 40 wt. %, 45 wt. %, 50 wt. %, 55 wt. %, 60 wt. %, 65 wt. %, 70 wt. %, 75 wt. %, 80 wt. %, or 85 wt. % of the prepolymer. The at least one organic polyisocyanate component may comprise up to 35 wt. %, 40 wt. %, 45 wt. %, 50 wt. %, 55 wt. %, 60 wt. %, 65 wt. %, 70 wt. %, 75 wt. %. 80 wt. %, 85 wt. %, or 90 wt. % of the prepolymer.

The prepolymer may further comprise a branching or chain extending agent. Any agent that contains two or more functional groups that can contain either hydroxyl or carboxylic groups may be used. Exemplary agents include, cycloaliphatic diepoxides, aromatic diepoxides, diepoxides with oxyalkyl backbones, 2,2,4-trimethyl-1,3-pentane diol monoisobutylate, glycerin, trimethylol propane (TMP), and mixtures thereof.

The chain extending agent may comprise from 1 to 20 weight percent of the prepolymer. The at least one chain extending agent may comprise at least 1 wt. %, 3 wt. %, 5 wt. %, 10 wt. %, 15 wt. %, or 18 wt. % of the prepolymer. The at least one chain extending agent may comprise up to 3 wt. %, 5 wt. %, 10 wt. %, 15 wt. %, 18 wt. %, or 20 wt. % of the prepolymer.

The prepolymer may be formed by reacting the polyester-polycarbonate copolymer polyol, the at least one organic polyisocyanate component, and the chain extending agent between 40 to 90 degrees Celsius for a period of two to twelve hours.

The prepolymer may have an NCO % of 5-40% content

The prepolymer may comprise from 40 to 90 weight percent of the second component (b). The prepolymer may comprise at least 40 wt. %, 45 wt. %, 50 wt. %, 55 wt/%, 60 wt. %, 65 wt. %, 70 wt. %, 75 wt. %, 80 wt. %, or 85 wt. % of the second component (b). The prepolymer may comprise up to 45 wt. %, 50 wt. %, 55 wt/%, 60 wt. %, 65 wt. %, 70 wt. %, 75 wt. %, 80 wt. %, 85 wt. %, or 90 wt. % of the second component (b).

The second component (b) may further comprise a solvent. Exemplary solvents include ketones such as acetone, and methyl ethyl ketone (MEK), and Ethyl acetate.

The solvent may comprise from 10 to 60 weight percent of the second component (b). The solvent may comprise at least 10 wt. %, 15 wt. %, 20 wt. %, 25 wt. %, 30 wt. %, 35 wt/%, 40 wt. %, or 55 wt. % of the second component (b). The solvent may comprise up to 15 wt. %, 20 wt. %, 25 wt. %, 30 wt. %, 35 wt/%, 40 wt. %, 45 wt. %, 50 wt. %, 55 wt. %, or 60 wt. % of the second component (b).

In certain embodiments, the second component (b) comprises (i) a polyisocyanate curative and (ii) optionally a solvent. The curative mixture may comprise 1,4-butanediol and at least one polyisocyanate. Exemplary polyisocyanates are previously mentioned herein. In embodiments where the second component (b) doesn't contain an ester-carbonate copolymer polyol, then component (a) must contain an ester-carbonate copolymer polyol to meet the required performance criteria.

In certain embodiments where the second component (b) comprises a polyisocyanate curative, the first component (a) may be present at from 60% to 95% by weight of the two-component composition. The first component (a) may comprise at least 60 wt. %, 65 wt. %, 70 wt. %, 75 wt. %, 80 wt. %, 85 wt. %, or 90 wt. % of the two-component composition. The first component (a) may comprise up to 65 wt. %, 70 wt. %, 75 wt. %, 80 wt. %, 85 wt. %, or 95 wt. % of the two-component composition.

In certain embodiments where the second component (b) comprises a polyisocyanate curative, the second component (b) may be present at from 5% to 40% by weight of the two-component composition. The first component (a) may comprise at least 5 wt. %, 10 wt. %, 15 wt. %, 20 wt. %, 25 wt. %, 30 wt. %, or 35 wt. % of the two-component composition. The second component (b) may comprise up to 10 wt. %, 15 wt. %, 20 wt. %, 25 wt. %, 30 wt. %, 35 wt. %, or 40 wt. % of the two-component composition.

The two-component composition may further comprise in either or both of (a) and (b), one or more materials selected from the group consisting of leveling agents, wetting agents, flow control agents, fillers, viscosity regulators, plasticizers, pigments, dyes, UV absorbers, adhesion promoters, thermal stabilizers, and mixtures thereof.

Exemplary plasticizer that may be used with the embodiments described herein include dioctyl phthalate (DOP) dibutyl phthalate (DBP); diisodecyl phthalate (DIDP); dioctyl adipate isodecyl malonate; diethylene glycol dibenzoate, pentaerythritol ester; butyl oleate, methyl acetylricinoleate; tricresyl phosphate and trioctyl phosphate; polypropylene glycol adipate and polybutylene glycol adipate; and the like. Such plasticizers can be used alone or in combination of two or more.

Exemplary adhesion promoters that may be used with the embodiments described herein include epoxy resins, phenolic resins, silane and amino silane coupling agents known in the art, alkyl titanates and/or aromatic polyisocyanates.

Exemplary leveling agents that may be used with the embodiments described herein include cellulose, e.g., nitrocellulose and cellulose acetate butyrate.

Exemplary wetting agents that may be used with the embodiments described herein include glycols, silanes, anionic surfactants, and any other wetting agents known in the art.

Exemplary flow control agents that may be used with the embodiments described herein include polyacrylic esters, non-ionic fluorinated alkyl ester surfactants, non-ionic alkylarylpolyether alcohols, silicones, and the like.

Exemplary fillers that may be used with the embodiments described herein include fumed silica, settling silica, silicic anhydride, silicic hydrate, talc, carbon black, limestone powder, coated and uncoated colloidal calcium carbonate, coated and uncoated ground calcium carbonate, coated and uncoated precipitated calcium carbonate, kaolin, diatomaceous earth, fired clay, clay, titanium dioxide, bentonite, organic bentonite, ferric oxide, zinc oxide, activated zinc white, and fibrous fillers such as glass fibers or filaments.

Exemplary viscosity regulators that may be used with the embodiments described herein include alkali-soluble, acid-soluble, and hydrophobically-modified alkali-soluble or acid-soluble emulsion polymers, cellulosics, modified cellulosics, natural gums, such as xanthan gum, and the like.

Exemplary pigments that may be used with the embodiments described herein include silica, calcium carbonate, magnesium carbonate, titanium oxide, iron oxide and carbon black.

Exemplary dyes that may be used with the embodiments described herein include mordant dyes, i.e., dyes prepared from plants, insects, and algae, and direct dyes, non-limiting examples being those based on benzidine or benzidine derivatives.

Exemplary ultra violet light absorbers that may be used with the embodiments described herein include benzotriazole-based ultra violet ray absorbers, salicylate-based ultraviolet ray absorbers, benzophenone-based ultraviolet ray absorbers, hindered amine-based light stabilizers and nickel-based light stabilizers.

Exemplary thermal stabilizers that may be used with the embodiments described herein include HCl scavengers, a non-limiting example being epoxidized soybean oil, esters of beta-thiodipropionic acid, non-limiting examples being lauryl, stearyl, myristyl or tridecyl esters, mercaptobenz-imidazole, the zinc salt of 2-mercaptobenzimidazole, zinc dibutyldithiocarbamate, dioctadecyl disulfide, pentaerythritol tetrakis-(beta-dodecylmercapto)-propionate, and lead phosphate.

Embodiments of the present invention are also directed to a method of bonding a first substrate to a second substrate. The method includes combining component a) and component b) to form a mixture; applying a coating of the mixture to at least one surface of the first substrate or the second substrate, and contacting a surface of the first substrate with a surface of the second substrate, where at least one of the contacting surfaces has the coating applied thereto.

In a particular embodiment of the invention, at least one of the first substrate and the second substrate includes plastic. The plastic may be selected from poly(ethylene), poly(propylene), poly(ethylene terephthalate), polyvinyl fluoride and mixtures thereof. Additionally, at least one of the first substrate and the second substrate may include wood, metals, plastics, paper, canvas, ceramics, stone, glass, and/or concrete.

When surfaces of the first and second substrate are contacted, they are contacted at conditions and for a length of time such that a bond is formed between the substrates. A particular advantage of the present invention is that combinations of substrates that heretofore have been difficult to bond with a sufficient peel strength (a measure of the force required to separate the substrates) can be so bonded. A non-limiting example of such combinations of substrates includes bonding polyvinyl fluoride and poly(ethylene terephthalate).

While not being bound to a single theory, the bond between substrates is formed using the inventive adhesive based on the interfacial interactions (for example, wetting and surface energies) between the adhesive and the substrates and the development of crosslinks in or the curing of the adhesive. The time it takes for substrate to develop initial adhesion is important because faster curing leads to faster processing.

In an embodiment of the invention, the substrates are contacted at a temperature sufficient to promote the adhesive's ability to bond the substrates together. As such, the substrates are contacted at a temperature of at least 0 degrees Celsius, in some cases at least 10 degrees Celsius, in other cases at least 20 degrees Celsius and in some situations at least 25 degrees Celsius. Also, the contact temperature for the substrates can be up to 150 degrees Celsius, in some cases up to 120 degrees Celsius, in other cases up to 100 degrees Celsius and in some situations up to 80 degrees Celsius. The temperature for contacting the substrates can be any value or range between any values recited above.

In an embodiment of the invention, the substrates are contacted at a pressure sufficient to promote the adhesive's ability to bond the substrates together. As such, the substrates are contacted at a pressure of at least ambient or atmospheric pressure, in some cases at least 10 psi, in other cases at least 20 psi and in some situations at least 30 psi. Also, the contact pressure for the substrates can be up to 500 psi, in some cases up to 400 psi, in other cases up to 300 psi and in some situations up to 250 psi. The pressure for contacting the substrates can be any value or range between any value recited above.

EXAMPLES

Objects and advantages of the embodiments described herein are further illustrated by the following examples. The particular materials and amounts thereof, as well as other conditions and details, recited in these examples should not be used to limit the embodiments described herein. Examples of the invention are identified by the letter "E" followed by the sample number while comparative samples, which are not examples of the invention are designated by the letter "C" followed by the sample number.

A description of the raw materials used in the examples is as follows: 1,4-butane diol (BDO) An alkane diol (99%) which is commercially available from SIGMA-ALDRICH®.

CR1 A curative mixture composed of 1,4 butanediol and polyisocyanate.

DESMODUR® L 75 An aromatic polyisocyanate based on toluene diisocyanate which is commercially available from Bayer MaterialScience.

Dimethyl carbonate (DMC) Dimethyl carbonate (DMC) (99.9%) is commercially available from KOWA American Corporation.

EPIKOTE™ Resin 154 A polyfunctional epoxy phenol novolac resin, available as a semi-solid and as the 80% m/m solution in methyl ethyl ketone commercially available from Momentive Performance Chemicals.

ISONATE® M143 Liquefied pure Methylene diphenyl diisocyanate (MDI) which is commercially available from The Dow Chemical Company.

Methyl Ethyl Ketone Methyl Ethyl Ketone (MEK) is commercially available from Sasol North America Inc.

Polyester 1 A copolymer of 1,6-hexanediol, isopthalic and adipic acid a with number average molecular weight of 3200.

Polyester 2 A copolymer of sebacic acid, isopthalic acid, terepthalic acid, monoethylene glycol, neopentyl glycol and adipic acid with a number average molecular weight of 8,000.

Polyester 3 A copolymer of sebacic acid, isopthalic acid, terepthalic acid, monoethylene glycol, neopentyl glycol and adipic acid with a number average molecular weight of 3,000.

Polyester 4 A copolymer of adipic acid, terephthalic acid, isophthalic acid, monoethylene glycol, 1,6 hexanediol, neopentyl glycol with a number average molecular weight of 2,000.

Trimethylolpropane Trimethylolpropane (TMP) flakes is commercially available from Perstorp.

TYZO® TPT Tetra-isopropyl titanate catalyst which is a reactive organic alkoxy titanate with 100% active content commercially available from DuPont.

VESTANAT® T 1890 A cycloaliphatic polyisocyanate based on isophorone diisocyanate. It contains isocyanurate groups and has a NCO-functionality between 3 and 4 and is commercially available from EVONIK Industries.

Synthesis of Butanediol Based PC Polyol (BDPC):

A 1,000 mL 4-neck round-bottom flask was equipped with a Dean-Stark trap, thermocouple, and mechanical stirrer. The fourth port was used to add dimethyl carbonate (DMC). The flask was heated with a heating mantle and monitored in the reaction via the thermocouple. 635 g butane diol (7.055 mol) was added to the flask and heated to 150 degrees Celsius while sweeping with $N_2$ to inert the flask and remove water present in the butane diol. TYZOR® TPT catalyst (188 mg) was added via syringe to the reaction flask. DMC was added via peristaltic pump and within 45 minutes DMC and methanol began to distill over at 62 degrees Celsius. In total, 1,079 g of DMC (11.994 mol, 1.7 eq wrt BDO) was added at a rate sufficient to maintain the overhead temperature between 62 to 65 degrees Celsius. Upon completion of the DMC add, the temperature was increased, in 10 degrees Celsius increments, to 200 degrees Celsius. Upon reaching 200 degrees Celsius, the pot temp was immediately reduced to 170 degrees Celsius and a nitrogen sweep was begun (overnight). The molecular weight (Mn) was found to be 3,065 g/mol (pdi 2.28) by GPC analysis and 3,660 g/mol via 1H NMR end-group analysis.

Next 20.86 g of BDO was added to the reaction mixture with stirring at 170 degrees Celsius. After two hours of reaction under these conditions, the Mn was found to be 1,590 g/mol by 1H NMR end-group analysis with 9 mole % carbonate end-groups. The reaction pressure was reduced to 120 torr and the reaction was stirred at 180 degrees Celsius for two hours resulting in an increase in molecular weight to 2,159 g/mol (1H NMR end-group analysis) with 3.9 mole % carbonate end-groups. BDO (3.0 g) was added and the reaction was stirred at 170 degrees Celsius for two hours before reducing the pressure to 80 torr and increasing the temperature to 200 degrees Celsius for an additional two hours. The molecular weight increased to 2,275 g/mol (1 H NMR end-group analysis) and the hydroxyl number was determined to be 49.36 mg KOH/g. A final BDO add of 4.0 g was made and the reaction was stirred for an additional two hours at 180 degrees Celsius. The molecular weight was reduced to 1,773 g/mol (1H NMR end-group analysis) and the carbonate end-groups were non-detect by 1H NMR. The hydroxyl number of the final polymer was 55 mg KOH/g.

TABLE I

Butane Diol Polycarbonate (BDPC) Polyol Formulations:
Table I: BDPC formulations.

| Raw Materials | Amount |
| --- | --- |
| 1,4 Butane Diol | 662.86 g |
| Titanium Catalyst | 188 mg |
| Dimethyl Carbonate | 1079 g |

Synthesis Ester Carbonate Copolymers

Adipic acid, isopthalic acid and 1,6-hexanediol based polyester (Polyester 1) was used. 600 g each of BDPC and Polyester 1 was weighed in a 3 L flask. The mixture was heated to 185 degrees Celsius for six hours under nitrogen. The mixture was cooled to 100 degrees Celsius and 0.26 g of dibutyl phosphate was added to quench the residual Ti catalyst. The resulting copolymer was mixed for 1 hour. Vacuum was applied for 30 minutes to strip off any volatiles. This copolymer is referred to as 50/50 ester carbonate in this disclosure. The above reaction was repeated with 600g of BDPC and 200g of Bester 190. The corresponding copolymer is called 75/25 ester carbonate.

TABLE II

50/50 Ester Carbonate Copolymer Formulations:
Table II: Ester Carbonate copolymer formulations.

| Raw Materials | Amount |
| --- | --- |
| Polyester 1 | 600 g |
| BDPC | 600 g |
| Dibutyl Phosphate | 0.26 g |

TABLE III

75/25 Ester Carbonate Copolymer Formulations:
Table III: Ester Carbonate copolymer formulations.

| Raw Materials | Amount |
| --- | --- |
| Polyester 1 | 200 g |
| BDPC | 600 g |
| Dibutyl Phosphate | 0.26 g |

Preparation of Adhesive (Component A)

At least one of ester carbonate (50/50 or 75/25), Polyester 1, Polyester 2, Polyester 3, and Polyester 4, and EPIKOTE™ Resin 154 was heated in the oven at 90 degrees Celsius to reduce viscosity. 300 g of polyol, 42 g of EPIKOTE™ Resin 154, and 180 g of ethyl acetate were added to a metal reactor equipped with a mixer and mixed for 15 minutes. The final mixture % solid was confirmed by heating 2 g of the mixture to 120 degrees Celsius for 2 hours. The weight of the solid remaining in the pan divided by the original weight (2 g) gave % solid in the mixture.

Preparation of Adhesive (Component B)

Ester Carbonate (50/50 or 75/25) and TMP were melted in an oven at 90 degrees Celsius. ISONATE® M143 was melted in an oven at 50 degrees Celsius. 300 g of ester carbonate and 800 g of ISONATE® M143 was added to a 2L glass reactor equipped with an anchor stirrer. 30 g of TMP was charged and the temperature of the reactor was maintained at 80 degrees Celsius. The reaction was run for 90 minutes resulting in a prepolymer with 19.9% NCO. The reaction mixture was cooled to 50 degrees Celsius, 485 g of MEK was then added and the mixture was stirred for 30 minutes and finally cooled down to room temperature. The final % solids was ~65-70%. Viscosity of the prepolymer mixture as measured by Brookfield viscometer at 25 degrees Celsius and 100 rpm was between 120-160 mPa-s.

Adhesive Strength Test 100 g of component A and 10 g of component B were weighed out in a jar at room temperature and mixed manually with a spatula for 30 seconds. The mixture was then applied on 11"×8.5" PET sheet using Mayer adhesive application equipment. The concentration of adhesive was ~9-10 g/m$^2$. The sheet was exposed to hot air (50-60 degrees Celsius) for 60 seconds to evaporate the solvent. A second PET sheet was then placed on top of the first sheet and passed through a 70 degrees Celsius hot roll twice to ensure sufficient lamination/bonding. The initial bond strength was considered good if the peel strength at 90 degrees Celsius was >1N/1.5 cm as measure by Lloyd LR 5KPlus dynamometer with a 50N load cell. The PET laminate was stored in the oven for 5 days at 35 degrees Celsius before further testing. The samples were considered pass if peel strength was >2.5 N/1.5 cm.

A hydrolysis test was performed by exposing the PET laminate to 121 degree Celsius steam. This was performed in a pressure cooker. The laminates were pulled out after 60 hours and 72 hours respectively and the residual peel strength was measured. The sample was considered a failure if the peel strength after hydrolysis was less than 2.5 N/1.5 cm.

Polyol A represents the polyol used to prepare the part A of the adhesive. Polyol B represents the polyol used for preparation of part B of the adhesive.

Based on the data presented in Table IV, it is clear that presence of ester carbonate on the OH side or the isocyanate side improves the adhesion. Polyester based systems give inferior hydrolytic strength. Ester carbonate based adhesives maintain their peel strength above the threshold (2.5N/1.5 cm) during hydrolysis test.

While the foregoing is directed to embodiments of the invention, other and further embodiments of the invention may be devised without departing from the basic scope thereof.

The invention claimed is:

1. A two-component curable ahesive or sealant composition; comprising:
   (a) a first component comprising a mixture of:
      (i) at least one polyol selected from the group comprising a polyester polyol, a polyester-polycarbonate copolymer polyol, and combinations thereof;
      (ii) a resin; and
      (iii) optionally a solvent; and
   (b) a second component comprising:
      (i) a prepolymer obtained by reacting:
         a polyester-polycarbonate copolymer polyol which is the reaction product of:
            a polyester polyol which is the reaction product of:
               one or more organic acids; and
               one or more glycols having a functionality of two or more; and
            one or more polycarbonate polyols;
         at least one organic polyisocyanate component; and
         at least one chain extending agent; and
      (ii) optionally a solvent.

2. The composition of claim 1, wherein the one or more organic acids are selected from phthalic acid, isophthalic acid, terephthalic acid, trimellitic acid, tetrahydrophthalic acid, hexahydrophthalic acid, tetrachlorophthalic acid, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid, itaconic acid, fatty acids, and combinations thereof.

TABLE IV

Results:

| Example/ Comparative Example | Polyol A side | Polyol B side | Initial Peel Strength (N/1.5 cm) | Final Peel Strength (after 5 days @ 35 C.) (N/1.5 cm) | Peel Strength after 60 hrs pressure cooker (N/1.5 cm) | Peel strength after 72 hrs pressure cooker (N/1.5 cm) |
|---|---|---|---|---|---|---|
| E1 | 50/50 PC/PE | CR1 | Pass | Pass | Pass | Pass |
| E2 | 50/50 PC/PE | 75/25 PC/PE | Pass | Pass | Pass | Pass |
| E3 | Polyester 4 | 75/25 PC/PE | Pass | Pass | Pass | Pass |
| C1 | 50/50 mixture of polyester 1 and polyester 2 | CR1 | Pass | Pass | Pass | Fail |
| C2 | Polyester 1 | CR1 | Pass | Pass | Fail | Fail |
| C3 | Polyester 4 | CR1 | Fail | Pass | Fail | Fail |
| C4 | Polyester 3 | CR1 | Fail | Fail | Fail | Fail |
| C5 | Polyester 3 | 75/25 PC/PE | Fail | Pass | Pass | Pass |
| C6 | Polyester 1 | PC/PE 50/50 | Pass | Pass | Pass | Fail |

3. The composition of claim 2, wherein the one or more glycols having a functionality of two or more are selected from ethylene glycol, propylene glycol-(1,2), propylene glycol-(1,3), octane-1,8-diol, neopentyl glycol, cyclohexane dimethanol (1,4-bis-hydroxymethylcyclohexane), 1-6-hexanediol, 1,4-butanediol, 2-methyl-1,3-propane diol, glycerine, trimethylolpropane, hexanetriol-(1,2,6) butane triol-(1,2,4), trimethylolethane, pentaerythritol, quinitol, mannitol, sorbitol, methylglycoside, diethylene glycol, triethylene glycol, tetrathylene glycol, polyethylene glycols, dibutylene glycol, polybutylene glycols, and combinations thereof.

4. The compositions of claim 3, wherein the one or more organic acids include adipic acid and isophthalic acid and the one more glycols includes 1, 6-hexanediol.

5. The composition of claim 1, wherein the one or more polycarbonate polyols comprise:
  (a) repeating units from one or more alkane diols having 2 to 50 carbon atoms with a number average molecular weight between 500 and 3,000; and
  (b) at least one carbonate compound selected from alkylene carbonates, diaryl carbonates, dialkyl carbonates, dioxolanones, hexanediol bis-chlorocarbonates, phosgene, urea, and combinations thereof.

6. The composition of claim 5, wherein the one or more alkane diols is selected from 1,4-butanediol, 1,5-pentanediol, 1,6-hexandiol, 1,7-heptanediol, 1,2-dodecanediol, cyclohexanedimethanol, 3-methyl-1,5-pentanediol, 2,4-diethyl-1,5-pentanediol, bis(2-hydroxyethyl)ether, bis(6-hydroxyhexyl) ether or short-chain $C_2$, $C_3$ or $C_4$ polyether diols having a number average molecular weight of less than 700 g/mol, and combinations thereof.

7. The composition of claim 5, wherein the at least one carbonate compound is selected from alkylene carbonates, diaryl carbonates, dialkyl carbonates, dioxolanones, hexanediol bis-chlorocarbonates, phosgene or urea.

8. The composition of claim 1, wherein the at least one organic polyisocyanate components are selected from polymeric polyisocyanates, aromatic isocyanates, cycloaliphatic isocyanates, or aliphatic isocyanates.

9. The composition of claim 8, wherein the at least one organic polyisocyanate components is a polymethylene polyphenylisocyanate that contains diphenylmethane diisocyanate (MDI).

10. The composition of claim 1, wherein the resin is selected from an acrylic resin, a phenol-formaldehyde resin, and combinations thereof.

11. The composition of claim 1, wherein the chain extending agent is trimethylol propane.

12. The composition of claim 1 further comprising: in either or both of (a) and (b), one or more materials selected from the group consisting of leveling agents, wetting agents, flow control agents, fillers, viscosity regulators, plasticizers, pigments, dyes, UV absorbers, adhesion promoters, thermal stabilizers, and mixtures thereof.

13. The composition of claim 1, wherein the at least one polyol is present at from 30 to 80 weight percent of the first component (a).

14. The composition of claim 1, wherein the polyester-polycarbonate copolymer polyol is present at from 10 to 60 weight percent of the prepolymer.

15. The composition of claim 1, wherein the first component (a) is present at from 60 to 90 weight percent of the two-component composition and the second component (b) is present at from 10 to 40 weight percent of the two-component composition.

* * * * *